(12) United States Patent
Pearce

(10) Patent No.: US 6,865,759 B2
(45) Date of Patent: Mar. 15, 2005

(54) CUSHIONS WITH NON-INTERSECTING-COLUMNAR ELASTOMERIC MEMBERS EXHIBITING COMPRESSION INSTABILITY

(75) Inventor: Tony M. Pearce, Alpine, UT (US)

(73) Assignee: EdiZONE, Inc., Alpine, UT (US)

( * ) Notice: Subject to any disclaimer, the term of this patent is extended or adjusted under 35 U.S.C. 154(b) by 115 days.

(21) Appl. No.: 09/932,393

(22) Filed: Aug. 17, 2001

(65) Prior Publication Data

US 2002/0013407 A1 Jan. 31, 2002

Related U.S. Application Data

(63) Continuation-in-part of application No. 09/303,979, filed on May 3, 1999, now Pat. No. 6,413,458, which is a continuation-in-part of application No. 08/968,750, filed on Aug. 13, 1997, now Pat. No. 6,026,527, which is a continuation-in-part of application No. 08/783,413, filed on Jan. 10, 1997, now Pat. No. 5,994,450, which is a continuation-in-part of application No. 08/601,374, filed on Feb. 14, 1996, now Pat. No. 5,749,111.
(60) Provisional application No. 60/226,726, filed on Aug. 18, 2000, and provisional application No. 60/021,019, filed on Jul. 1, 1996.

(51) Int. Cl.[7] .......................... A47C 16/00; C08L 53/00
(52) U.S. Cl. ..................... 5/655.5; 524/505; 524/571; 524/575
(58) Field of Search ................... 5/655.5; 524/505, 524/571, 575; 36/28

(56) References Cited

U.S. PATENT DOCUMENTS

| | | | |
|---|---|---|---|
| 3,827,999 A | 8/1974 | Crossland |
| 4,369,284 A | 1/1983 | Chen |
| 4,618,213 A | 10/1986 | Chen |
| 4,680,233 A | 7/1987 | Camin et al. |
| 4,716,183 A | 12/1987 | Gamarra et al. |
| 4,833,193 A | 5/1989 | Sieverding |
| 4,852,646 A | 8/1989 | Dittmer et al. |
| 4,942,270 A | 7/1990 | Gamarra |
| 5,104,930 A | 4/1992 | Rinde et al. |
| 5,149,736 A | 9/1992 | Gamarra |
| 5,153,254 A | 10/1992 | Chen |
| 5,177,143 A | 1/1993 | Chang et al. |
| 5,239,723 A | 8/1993 | Chen |
| 5,262,468 A | 11/1993 | Chen |
| 5,334,646 A | 8/1994 | Chen |
| 5,336,708 A | 8/1994 | Chen |
| 5,441,560 A | 8/1995 | Chiotis et al. |
| 5,442,004 A | 8/1995 | Sutherland et al. |
| 5,475,890 A | 12/1995 | Chen |
| 5,508,334 A | 4/1996 | Chen |
| 5,541,250 A | 7/1996 | Hudson et al. |
| 5,549,743 A | 8/1996 | Pearce |
| 5,618,882 A | 4/1997 | Hammond et al. |
| 5,624,294 A | 4/1997 | Chen |
| 5,633,286 A | 5/1997 | Chen |
| 5,655,947 A | 8/1997 | Chen |
| 5,710,206 A | 1/1998 | Francis et al. |
| 5,731,359 A | 3/1998 | Moser et al. |
| 5,760,117 A | 6/1998 | Chen |
| 5,849,824 A | 12/1998 | Mercer et al. |
| 5,868,597 A | 2/1999 | Chen |
| 5,884,639 A | 3/1999 | Chen |

(List continued on next page.)

Primary Examiner—Peter D. Mulcahy
(74) Attorney, Agent, or Firm—Daniel P. McCarthy; Parsons Behle & Latimer

(57) ABSTRACT

Cushions and cushion elements with non-intersecting-columnar elastomeric members exhibiting compression instability are disclosed. The cushions and cushion elements may be made from gelatinous elastomer materials. The cushions and cushion elements have application in a variety of fields, including foot care products, seat cushions, mattresses and mattress overlays for consumer and medical applications, carry straps, sports injury prevention, orthopedics, vibration dampeners for electrical and electronic equipment, shock absorbers and others.

19 Claims, 1 Drawing Sheet

U.S. PATENT DOCUMENTS

| | | | | |
|---|---|---|---|---|
| 5,916,664 A | * | 6/1999 | Rudy | ............ 428/178 |
| 5,929,138 A | | 7/1999 | Mercer et al. | |
| 5,938,499 A | | 8/1999 | Chen | |
| 5,962,572 A | | 10/1999 | Chen | |
| 5,985,976 A | | 11/1999 | Wartenberg et al. | |
| 5,994,446 A | | 11/1999 | Graulus et al. | |
| 5,994,450 A | | 11/1999 | Pearce | |
| 6,219,867 B1 | * | 4/2001 | Yates | ............ 5/655.5 |

* cited by examiner

CUSHIONS WITH NON-INTERSECTING-COLUMNAR ELASTOMERIC MEMBERS EXHIBITING COMPRESSION INSTABILITY

CROSS REFERENCE TO RELATED APPLICATIONS

This patent application is a continuation-in-part patent application of Ser. No. 09/303,979 filed on May 3, 1999, now U.S. Pat. No. 6,413,458, which is a continuation-in-part patent application of Ser. No. 08/968,750 filed on Aug. 13, 1997, now U.S. Pat. No. 6,026,527, which is a continuation-in-part patent application of Ser. No. 08/601,374 filed on Feb. 14, 1996, now U.S. Pat. No. 5,749,111 and which is a continuation in part of Ser. No. 08/783,413 filed on Jan. 10, 1997, now U.S. Pat. No. 5,994,450, which claims priority to U.S. provisional patent application Ser. No. 60/021,019 filed on Jul. 1, 1996, and priority is claimed to each of the foregoing. Priority is also claimed to U.S. provisional patent application No. 60/226,726 filed on Aug. 18, 2000.

BACKGROUND OF INVENTION

The invention relates to the field of cushioning, and in particular cushions made from soft elastomeric material, including gelatinous elastomers, and those cushions that operate according to a principle of compression instability.

Previously, the inventor made inventions concerning gelatinous elastomers ("gels") disclosed and claimed in U.S. Pat. No. 5,994,450, which is hereby incorporated by reference. The inventor has also made inventions in the field of elastomeric cushions with intersecting or joined buckling columns, as disclosed and claimed in U.S. Pat. Nos. 5,749,111 and 6,026,527, which are hereby incorporated by reference. These are referred to herein as cushions having intersecting-columnar members.

In cushions having intersecting-columnar members, column walls are shared between columns. When an irregularly-shaped object is placed on the buckling column cushion, the walls will buckle under areas of peak load, thereby relieving and distributing cushioning pressure. The buckling occurs when maximum support pressure per the cushion design is exceeded in a particular area of the cushion. Buckling is accomplished by the column walls buckling or folding on themselves. Surrounding columns support the cushioned object even though buckling has occurred in an area of peak load. In this way, pressure is reasonably equalized without significant high pressure points.

Although intersecting-wall buckling columns are very efficient and useful and represent an significant advance in the science of cushioning, they are not totally without problems and challenges. One problem with cushions having intersecting-columnar members is manufacturability. When buckling column cushions having intersecting-columnar members are molded, the gel material from which they are made must flow into a mold and meet itself at each column intersection. There are a myriad of such intersections, one at every corner of every joined column. At these intersections, there is a knit line. Knit lines are at risk of having poor strength due to incomplete melding of opposing flows of flowing gel material.

A second problem with cushions having intersecting-columnar members is weight. Joinder of adjacent columns in buckling cushions having intersecting-columnar members adds to the stability of each individual column because they each can derive stability from adjoining columns. Thus, in order to achieve buckling at a low load level, buckling cushions having intersecting-columnar members must be relatively tall, high or deep. Increasing the size of the cushion in this dimension adds gel material and increases weight (and material expense).

A third problem with cushions having intersecting-columnar members relates to the manufacturing constraints concerning size. In making molds for an injection molding process, there are constraints on the minimum saw kerfs and minimum thicknesses of passageways within the mold to achieve acceptable gel flow.

A fourth problem with cushions having intersecting-columnar members is tooling cost. Molds and dies for making buckling cushions having intersecting-columnar members are complex and time consuming and costly to make.

The prior art included patterned gel cushions. Patterned gel cushions are gels with patterns, cuts or texture having geometric shapes and dimensions insufficient to produce elastomeric members that have compression instability. The pattern merely accommodates changing shape of the gel as it compresses. Thus, although those prior art devices at first glance may have some physical resemblance to the invention, they fail to include either the structure or functionality that is the subject of the present invention.

SUMMARY OF INVENTION

It is an object of some embodiments of the invention to provide cushions and cushion elements with elastomeric members exhibiting compression instability and which do not have intersecting or joined walls, referred to herein as non-intersecting-columnar members to distinguish them from intersecting-columnar cushion members.

Further objects, features and advantages of the invention will become apparent to persons of ordinary skill in the art on reading this document.

DETAILED DESCRIPTION

Figure 1:
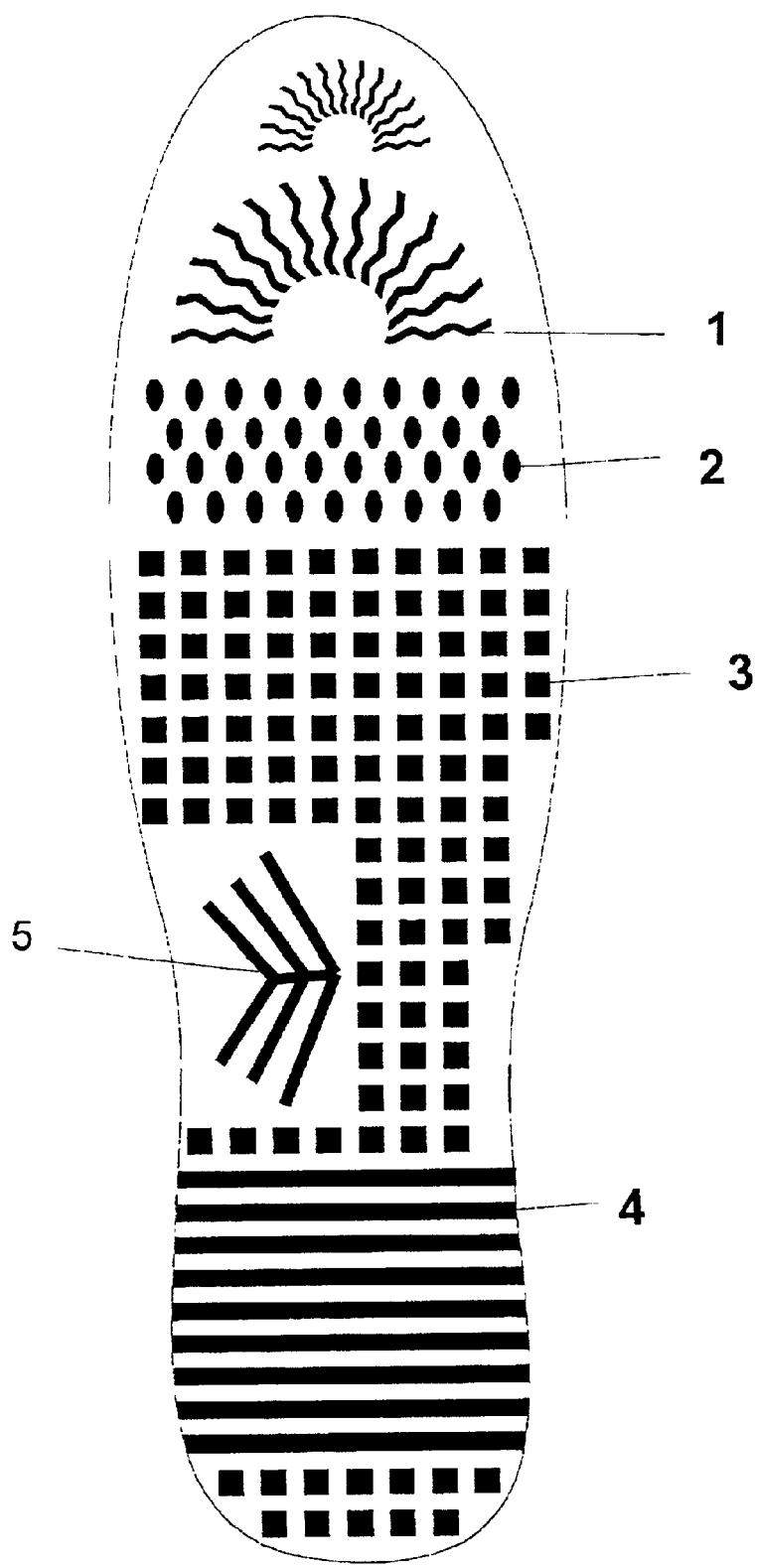
FIG. 1 depicts an example of a cushion with non-intersecting-columnar elastomeric members exhibiting compression instability.

As an introductory matter, the reader may find it helpful to be informed of materials which may be used to fabricate the structures of the invention. Any elastomeric material which tends to compress under a load can be used as a material to make the cushions and cushion elements of the invention. Such materials include natural and synthetic rubbers, foams, thermoplastic elastomers, polyurethane elastomers, silicone elastomers, polyvinyl chloride (PVC) elastomers, olefinic elastomers, polyamide elastomers, and the like. Superior performance has been achieved by the inventor when gelatinous elastomers which are substantially non-flowable at room temperature (below 130 degrees Fahrenheit) are used. Such gels are disclosed in U.S. Pat. No. 5,994,450 which is hereby incorporated by reference. Alternative gels, which the inventor considers inferior due to their high tack, excessive oil bleed and low durability, have been patented in the name of John Y. Chen of Applied Elastomerics, Inc. Examples of such gels may be found in U.S. Pat. Nos. 6,161,555; 6,148,830; 6,117,176; 6,050,871; 6,033,283; 5,962,572; 5,938,499; 5,884,639; 5,868,597; 5,760,117; 5,655,947; 5,633,286; 5,624,294; 5,508,334; 5,475,890; 5,336,708; 5,334,222; 5,324,222; 5,262,468; 5,260,371; 5,239,723; 5,153,254; 4,618,213; and 4,369,284.

U.S. Pat. No. 5,994,450 is believed to be the first to disclose a styrene ethylene-butylene ethylene-propylene styrene gel, and U.S. Pat. No. 3,827,999 by inventor Ronald Crossland appears to be the first to disclose an SEBS gel. Another gel that is available is called "J-SOFT", a pelleted injection molding material offered by ATP, a division of Newgrange Company in Rhode Island.

As a general matter, cushions and cushioning elements of the invention may be fabricated using an A-B-A tri block copolymer pasticized with a plasticizing agent such as an oil. Some embodiments of the A-B-A triblock copolymer will have glassy end blocks and elastomer mid blocks. For example, SEEPS, SEBS, and SEPS are such polymers, and mineral oil is a suitable plasticizing agent. Additives may be included such as anti-oxidants, colorants, and microspheres to reduce weight and/or tackiness. It is expected that the ratio of oil to polymer in the gel will be in the range of 1.0:1.0 to 8.5:1.0, although it could be outside of that range. In most gel structures of the invention, the ratio of oil to polymer will be 1.5:1.0 to 5.5:1.0.

Gelatinous elastomers are a good choice as a material for making cushions and cushioning elements of the invention because of their ability to be subject to repeated or sustained loads without a permanent change in material dimensions or properties and due to their ability to reshape hydrostatically under load.

Gels used to make cushions of the invention may be pre-fabricated prior to making the cushion in question, or they can be made at the time of cushion manufacture. The gels may be made from any appropriate technique including melt blending, solvent blending, and mixing using a single screw, twin screw or multiple screw mixing device, or as part of the injection molding or extrusion process.

Referring to FIG. 1, a cushion of the invention is depicted as a shoe insole by way of example and for purposes of discussion. In practice, the invented structures may be used in a variety of fields and for a variety of applications without bounds. The insole depicts non-intersecting-columnar elastomeric members exhibiting compression instability in a variety of configurations. The insole may have a base of an appropriate material such as fabric or gel. A cover for the insole may also be provided.

In FIG. 1, member 1 is a curvy wall of gel which supports a certain amount of load by compressing, during which the wall thickness increases by the well-known principle of Poisson"s Effect. However, if the pressure exceeds the pre-engineered stability limit of that non-intersecting-columnar elastomeric member 1, that wall will fold or bend at one or more points along its height in order to relieve peak pressure. Alternative walls could be straight or have other shapes. Engineering of planned instability into a gel column in a cushion utilizes the inventive principles. Such engineering activity may take into account several factors, including durometer of the gel, thickness and cross-sectional shape of the column wall, height of the column wall, maximum load exerted by the cushioned object, and characteristics and locations of nearby non-intersecting-columnar elastomeric members.

Also in FIG. 1, member 2 is a non-intersecting-columnar elastomeric member configured as a vertical post of gel having an oval cross section. The post 2 will also have engineered instability in its design. Each post is considered to have a longitudinal axis along the direction from which it is expected to receive a compressive force, and the posts are intended to be designed so that such compressive forces cause unstable buckling.

Member 3 of FIG. 1 depicts a non-intersecting-columnar elastomeric member configured as a vertical post of gel having a square cross section, again exhibiting compression instability.

Member 4 of FIG. 1 depicts a non-intersecting-columnar elastomeric member configured as a straight wall running the width of the depicted insole. Other dimensions and orientations of the member are possible. Height of the wall, width of the wall, and durometer of the gel are chosen to achieve compression instability.

Member 5 of FIG. 1 depicts an arch support configured from nonintersecting-columnar elastomeric members joined at one of their ends. Principles of the invention can be upheld as long as enclosed hollow columns with intersecting walls and/or walls shared with other enclosed hollow columns are not provided. In the context of the foregoing sentence, enclosed shall mean that in any direction transverse to the anticipated principle cushioning direction, the elastomeric material seals the hollow column. Enclosed does not necessarily mean that the top or bottom of the hollow column is sealed by the elastomeric material.

Non-intersecting-columnar elastomeric members may be of different heights at different locations on a cushion as desired to accommodate the cushioned object, such as a foot arch. Using such geometric variation, cushions can be designed to suit almost any irregular shape.

Non-intersecting-columnar elastomeric members may include hollow posts or columns, as long as they maintain the non-intersecting and compression instability principles of the invention and their walls do not share walls with other fully enclosed hollow columns. Hollow posts or columns may be open or closed at their top ends or anywhere within their height as desired.

Compression instability of non-intersecting-columnar gel members may be engineered taking into account member geometry and dimensions and gel material properties. In addition to compression instability of non-intersecting-columnar elastomeric members, other functions which may be desired to be engineered into cushions of the invention include rebound rate of the non-intersecting-columnar members, shock absorption, and vibration attenuation. Compression instability may be engineered to anticipate loading of force onto the cushion from a pre-determined direction or directions.

Shape of the non-intersecting-columnar members can be any shape as desired for the particular cushioning application. Important factors include height of the column, cross sectional shape of the column, durometer of the material, and desired instability threshold.

Avoiding intersecting walls in the non-intersecting-columnar members of the invention permits fabrication of cushions and cushion elements of the invention by injection molding without creating knit lines and their concomitant weaknesses. Molds for making the invented structure tend to be simple and inexpensive to produce. Weight of the finished cushion or cushioning element is reduced compared to other gel or elastomer cushion structures due to less total wall length of the columns. It is also quite easy within the invention to produce a cushion or cushion element that has a varied or irregular geometric appearance. As desired, all or just a subset of the cushioning members may be non-intersecting, and all or just a subset of the elastomeric cushioning members may exhibit compression instability.

The cushioned object need not be in direct physical contact with the non-intersecting gel column members, and may be separated by a cover or other material.

The invention is applicable to any cushioning, pressure relieving, shear relieving, shock absorbing, vibration attenuating, or energy returning cushioning application, regardless of size of the cushioning elements. The cushions and cushion elements have application in a variety of fields, including foot care products, seat cushions, mattresses and mattress overlays for consumer and medical applications, carry straps, sports injury prevention, orthopedics, vibration dampeners for electrical and electronic equipment, shock absorbers and others.

While the present invention has been described and illustrated in conjunction with a number of specific embodiments, those skilled in the art will appreciate that variations and modifications may be made without departing from the principles of the invention as herein illustrated, as described and claimed. The present invention may be embodied in other specific forms without departing from its spirit or essential characteristics. The described embodiments are considered in all respects to be illustrative and not restrictive. The scope of the invention is, therefore, indicated by the appended claims, rather than by the foregoing description. All changes which come within the meaning and range of equivalence of the claims are to be embraced within their scope.

What is claimed is:

1. A cushioning element comprising:
    a gelatinous elastomer material that is substantially non-flowable at room temperature,
    a plurality of non-intersecting-columnar elastomeric members, at least some of said non-intersecting-columnar members being free from intersection with walls of other members,
    at least some of said non-intersecting-columnar elastomeric members including a quantity of said non-flowable gelatinous elastomer material,
    at least some of said column members exhibiting a characteristic of compression instability in response to being subjected to force exerted on them by a cushioned object.

2. A cushioning element as recited in claim 1 wherein said gelatinous elastomer material comprises an elastomeric copolymer plasticized with a plasticizing agent.

3. A cushioning element as recited in claim 2 wherein said plasticizing agent is an oil.

4. A cushioning element as recited in claim 1 wherein said cushioning element has shape memory so that when a cushioned object is removed from contact with the cushioning element, the cushioning element has a tendency to return to a shape that approximates the shape of the cushioning element before the cushioning element and the cushioned object came into contact with each other.

5. A cushioning element as recited in claim 1 wherein at least some of said non-intersecting-columnar elastomeric members are of a different cross-sectional shape than others of said non-intersecting-columnar elastomeric members.

6. A cushioning element as recited in claim 1 wherein said compression instability is characterized by folding or buckling of said non-intersecting-columnar elastomeric member in response to a compressive force of sufficient magnitude.

7. A cushioning element as recited in claim 1 wherein said compression instability is achieved through a combination of the magnitude and direction of the said force, the geometry of said non-intersecting-columnar elastomeric members and the material properties of said elastomer.

8. A cushioning element as recited in claim 1, wherein the cushioning element is designed to serve a function selected from the group consisting of pressure relieving, shear relieving, shock absorbing, vibration attenuating, and energy returning.

9. A yieldable cushioning element comprising:
    a gelatinous elastomer cushioning media having shape memory and being substantially solid and non-flowable at temperatures below 130 degrees Fahrenheit, said gelatinous elastomer being formed into at least part of a cushioning element that has a top, a bottom, and an outer periphery,
    said gelatinous elastomer compressible so that it will deform under the compressive force of a cushioned object, a plurality of non-intersecting-columnar elastomeric members, at least some of said non-intersecting-columnar members being free from intersection with walls of other members,
    at least some of said non-intersecting-columnar elastomeric members including a quantity of gelatinous elastomer,
    at least some of said non-intersecting-columnar members exhibiting compression instability in response to a compressive force, and the cushioning element being adapted to have a cushioned object placed in contact with said top, and at least one of said non-intersecting-columnar elastomeric members being capable of buckling beneath at least a portion of a cushioned object.

10. A device as recited in claim 9 wherein at least some of said non-intersecting-columnar elastomeric members are not in direct physical contact with any other non-intersecting-columnar elastomeric members except through a common base member.

11. A device comprising: a cushioning element having a top, a bottom, a center and an outer periphery,
    a quantity of gel that is substantially non-flowable at room temperature,
    a plurality of non-intersecting-columnar elastomeric members, at least some of said non-intersecting-columnar members being free from shared walls with other members,
    each non-intersecting-columnar elastomeric member having an axis,
    at least some of said non-intersecting-columnar elastomeric members being formed at least in part from said gel,
    at least some of said non-intersecting-columnar elastomeric members having no direct contact with other non-intersecting-columnar elastomeric members when not placed under load, and
    at least some of said non-intersecting-columnar elastomeric members exhibiting compression instability when exposed to a compressive force.

12. A device as recited in claim 11 wherein said compression instability is achieved through a buckling of said non-intersecting-columnar elastomeric members.

13. A device as recited in claim 12 wherein said gel includes an A-B-A triblock copolymer plasticized with a plasticizing agent.

14. A device as recited in claim 13 wherein said A-B-A triblock copolymer is selected from the group consisting of SEEPS, SEPS, and SEBS.

15. A device as recited in claim 14 wherein said plasticizing agent is an oil.

16. A device as recited in claim 14 wherein said copolymer and said plasticizing agent are present in said gel in a range of ratios from 1.0:1.0 to 8.5:1.0 of plasticizing agent to copolymer.

17. A device as recited in claim 14 wherein said copolymer and said plasticizing agent are present in said gel in a range of ratios from 1.5:1.0 to 5.5:1.0 of plasticizing agent to copolymer.

18. A cushioning element as recited in claim 2 wherein said elastomeric copolymer is an A-B-A triblock copolymer.

19. A cushioning element as recited in claim 18 wherein said A-B-A triblock copolymer is selected from the group consisting of SEEPS, SEPS, and SEBS.

* * * * *